United States Patent [19]
Ina et al.

[11] Patent Number: 4,741,324
[45] Date of Patent: May 3, 1988

[54] SELF-HEATING CONTAINER

[75] Inventors: Shizuo Ina; Shoji Tokura, both of Shizuoka, Japan

[73] Assignees: Toyo Jozo Kabushiki Kaisha, Shizuoka; Ueda Lime Manufacturing Co., Ltd., Fifu, both of Japan

[21] Appl. No.: 70,111

[22] Filed: Jul. 6, 1987

Related U.S. Application Data

[63] Continuation of Ser. No. 848,290, Apr. 4, 1986, abandoned.

[30] Foreign Application Priority Data

Apr. 4, 1985 [JP] Japan .................................. 60-69999

[51] Int. Cl.$^4$ ................................................ F24J 1/00
[52] U.S. Cl. ................................................... 126/263
[58] Field of Search ...................... 126/263, 261; 62/4; 426/109

[56] References Cited

U.S. PATENT DOCUMENTS

| | | | |
|---|---|---|---|
| 862,151 | 8/1907 | Frieoman et al. | 126/263 |
| 1,897,723 | 2/1933 | Free | 126/263 X |
| 2,288,895 | 7/1942 | Fink | 126/263 |
| 2,733,709 | 2/1956 | Sukacev . | |
| 3,429,672 | 2/1969 | Young . | |
| 3,683,889 | 8/1972 | Hoffman | 126/263 |
| 3,903,011 | 9/1975 | Donnelly . | |
| 3,970,068 | 7/1976 | Sato | 126/263 |
| 4,057,047 | 11/1977 | Gossett | 126/263 |
| 4,501,259 | 2/1985 | Apellaniz . | |
| 4,640,264 | 2/1987 | Yamaguchi et al. | 126/263 |

FOREIGN PATENT DOCUMENTS 2231342 12/1974 France .

Primary Examiner—Randall L. Green
Attorney, Agent, or Firm—Young & Thompson

[57] ABSTRACT

A container capable of heating the contents of the container from inside, having at its bottom a cylindrical inner shell made of a thermoconductive material opening downward and defining internally of itself a reaction chamber in which are disposed an active substance and a reacting substance capable of causing an exothermic reaction upon contact with each other. These substances are isolated from each other by a partition. A sealing lid is disposed across the opening of the inner shell so as to seal the reaction chamber and constitute the container bottom plate, and has a temporarily sealed piercing hole. A piercer is used for piercing through the temporarily sealed piercing hole into the reaction chamber so as to rupture the partition isolating the reaction components to cause contact of the reaction components with each other to initiate the exothermic reaction.

3 Claims, 3 Drawing Sheets

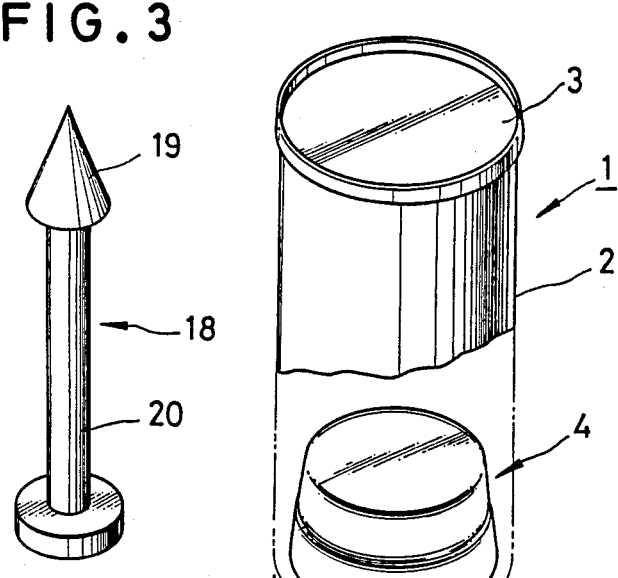
FIG. 3
FIG. 2
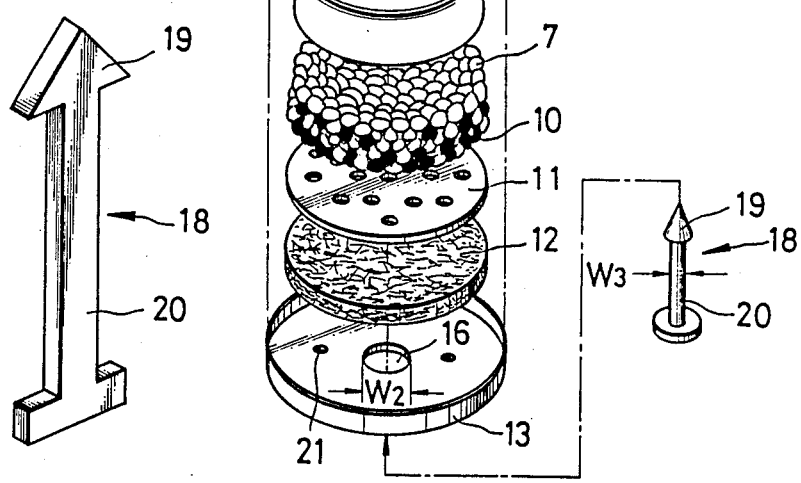
FIG. 4

SELF-HEATING CONTAINER

This application is a continuation, of application Ser. No. 848,290, filed 4/4/86, abandoned.

BACKGROUND OF THE INVENTION

The present invention relates to a container capable of heating the contents of the container, such as foods or beverages, for example, alcoholic beverages such as wine, sake, coffee, tea, soup, stew, dairy beverages, fruit juices and so on, from the inside and, in particular to a container free from the danger of bursting due to abnormal increase of the internal pressure of the reaction chamber upon violent progress of the heat generating reaction.

Self-heating containers are known, having a construction in which the container or cup for foods or beverages for example, and a heating means are assembled in a unit. This type of integrally heated container is so constructed that a reaction chamber is arranged within the container and two reaction components composed of an exothermic substance consisting of, for example, CaO and a reacting substance consisting of, for example, water are stored therein isolated from each other by a partition; and the heating is effected by operating a reaction initiation means consisting of, for example, a piercing spike which pierces said reaction chamber to rupture the partition, in order to cause contact of the reaction components with each other to initiate the exothermic hydration reaction. This internally heatable container has no means for guarding against an abnormal increase in the internal pressure of the reaction chamber. Thus the prior art internally heatable containers may burst upon initiating the heating reaction.

BRIEF SUMMARY OF THE INVENTION

The inventors had investigated the cause of the bursting trouble of the prior art internally heatable containers by repeated experiments, by piercing the reaction chamber from the outside with a reaction-initiating spike and then drawing the spike out to rupture the partition layer to cause contact of the reacting substance, namely, water, with the other substance, namely, CaO, to initiate the exothermic hydration reaction.

It was found that high temperature steam was violently generated, while a muddy $Ca(OH)_2$ was formed by the hydration reaction of CaO with water. During the early stage of the reaction, the steam generated escapes from the hole formed by the piercing spike to the outside of the container. When, however, the muddy $Ca(OH)_2$ started to form, the pierced hole would sometimes be clogged by the muddy products, resulting in abnormal increase in the internal pressure of the reaction chamber, causing at least, though in rare cases, a bursting of the reaction chamber. It was also found that such an undesirable circumstance is caused by the agitation of the container due to an abrupt reaction.

The present invention results from the research comprising the above investigation.

Thus, the object of the present invention is to provide a container capable of heating from the inside, in which the safety of the container is greatly increased by guiding the high temperature steam generated during the reaction within the reaction chamber effectively out to the external atmosphere.

This object is achieved according to the present invention by providing a container capable of heating the contents of the container from the inside, having at its bottom a cylindrical inner shell made of a thermoconductive material opening downward and defining a reaction chamber in which an active substance and a reacting substance as the reaction components capable of causing reaction upon contact with each other are stored isolated from each other by a partition, which comprises a fragile inner lid disposed at the openings of said inner shell and a sealing lid disposed outside said inner lid so as to seal said reaction chamber, said sealing lid having a temporarily sealed piercing hole for easy piercing by a piercer in order to cause contact of the reaction components with each other to initiate the heat-generating reaction.

The invention also proposes a container capable of internal heating, which comprises a fragile inner lid closing the opening of the inner shell; a sealing lid disposed outside said inner lid and having a temporarily sealed piercing hole; a gas-permeable member interposed between said inner lid and said sealing lid; and a reaction initiation means consisting of a piercer to be used for piercing the reaction chamber to rupture the partition isolating the reaction components so as to cause contact of the reaction components with each other.

The invention proposes furthermore a container capable of heating from inside, having at its bottom a cylindrical inner shell made of a thermoconductive material opening downward and defining internally a reaction chamber in which an active substance and a reacting substance as the reaction components capable of causing exothermic reaction upon contact with each other are stored isolated from each other by a partition, which comprises a fragile inner lid disposed at the opening of said inner shell and a sealing lid disposed outside said inner lid so as to seal the reaction chamber, said sealing lid having a temporarily sealed piercing hole for easy piercing by a piercer in order to cause contact of the reaction components with each other to initiate the reaction, wherein said inner lid itself is gas-permeable.

The present invention proposes moreover a container capable of heating from inside, having at its bottom a cylindrical inner shell made of a thermoconductive material opening downward and defining internally a reaction chamber in which an active substance and a reacting substance as the reaction components capable of causing exothermic reaction upon contact with each other are stored isolated from each other by a partition, comprising a sealing lid having a temporarily sealed piercing hole and being disposed at the opening of said inner shell so as to seal said reaction chamber, wherein the container is provided with a reaction initiation means consisting of a piercer to be used for piercing through said temporarily sealed piercing hole into the reaction chamber so as to rupture the partition isolating the reaction components to cause contact of the reaction components with each other to initiate the reaction.

The present invention proposes still further a container capable of heating from inside, having at its bottom a cylindrical inner shell made of a thermoconductive material opening downward and defining internally a reaction chamber in which an active substance and a reactive substance as the reaction components capable of causing exothermic reaction upon contact with each other are stored isolated from each other by a partition, which comprises a sealing lid disposed at the opening of said inner shell so as to seal the reaction chamber, said sealing lid having a temporarily sealed piercing hole, and a piercer for piercing through said temporarily sealed piercing hole into the reaction chamber, wherein the inner diameter of the temporarily sealed piercing hole is substantially larger than the outer diameter of the shank of the piercer.

BRIEF DESCRIPTION OF THE DRAWINGS

FIG. 2 illustrates the construction of the internally heatable container in an exploded view.

FIGS. 3 and 4 show two embodiments of the piercer according to the present invention, each in a perspective view.

DETAILED DESCRIPTION OF THE INVENTION

Figure 1:
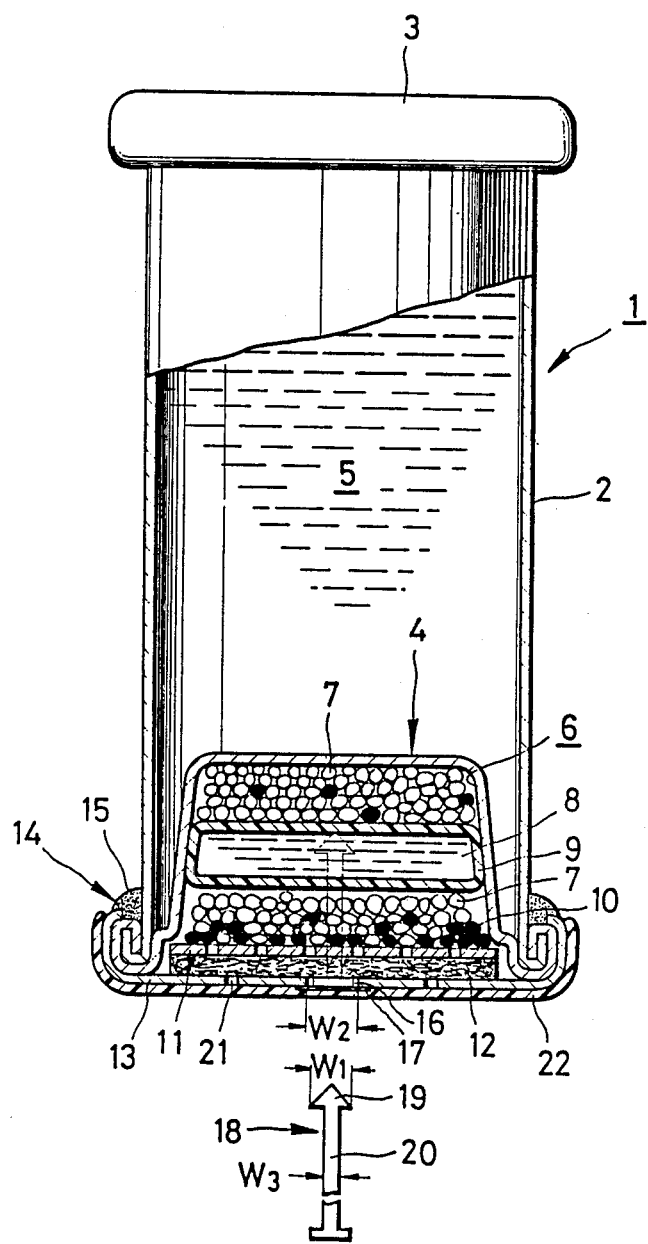
FIG. 1 shows an internally heatable container according to the present invention in a partly sectioned view.
Figure 5:
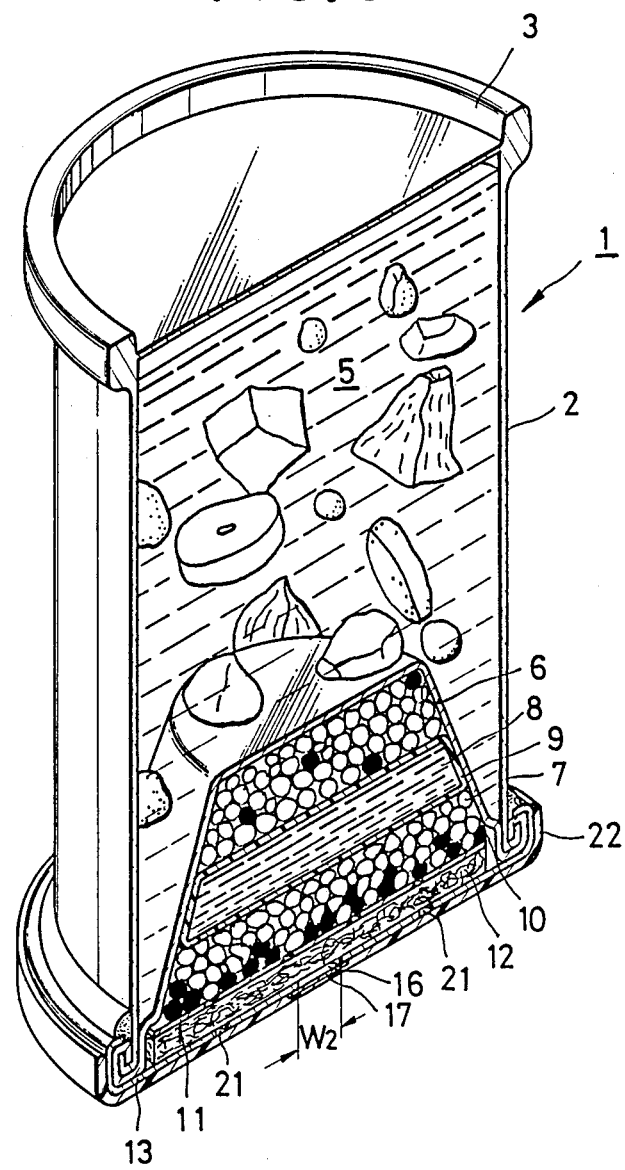
FIG. 5 shows the container and contents in a sectioned perspective view.

The inner shell defining internally the reaction chamber according to the present invention is made of a material having a high heat resistance, a high strength against pressure and a high thermal conductivity. Examples of such a material include iron, aluminum, copper, stainless steel and sheets of these metals which have been subjected to a corrosion prevention treatment as well as heat-resistant high polymer substances and paper substances.

The reacting substance to be reacted with the active substance according to the present invention is stored within the reaction isolated by a partition from the active substance by being enclosed in a sealed package or bag. For the material of this sealed package, there may be employed preferably metal-laminated materials composed of, for example, a high polymeric material with or without heat resistance, paper, or cloth, with laminated metal foil. A bag of polymeric material may also be employed. When the package or bag is made of an aforementioned preferred material, there occurs no penetration of water molecules through the package wall even after a prolonged time, as contrasted to a conventional water bag made of high polymeric material, so that water can be retained completely. Thus, aging or deterioration of the exothermic substance by reaction with the penetrating water during storage can be avoided. Therefore, a significant loss of activity can completely be avoided.

As the reacting substance according to the present invention, water or antifreeze solution may be employed. For the antifreeze aqueous solution, an aqueous solution of salt, an aqueous alcohol solution or mixtures of these may be used. As the salt to be used for the aqueous salt solution according to the present invention, there may be mentioned water-soluble salts of ammonia and metals with valences of 1–3 or ammonium salts, for example, salts of sodium, potassium, magnesium, calcium, barium, copper, iron, nickel, zinc and aluminum, with anions of halogen, carbonate, sulfate and so on. Examples of suitable inorganic water-soluble salts include $NaCl$, $KCl$, $MgCl_2$, $BaCl_2$, $CuCl_2$, $FeCl_3$, $MnCl_2$, $NiCl_2$, $ZnCl_2$, $AlCl_3$, $CaI_2$, $CaBr_2$, $BaI_2$, $CuBr_2$, $CuSO_4$, $FeBr_2$, $FeSO_4$, $MgI_2$, $NiBr_2$, $Al(SO_4)_3$, $Na_2SO_4$, $NaHCO_3$, $NH_4Cl$, $NH_4I$, $NH_4F$ and $(NH_4)_2SO_4$. These salts are used alone or in various combinations. It is particularly suitable to employ NaCl in the form of, for example, a 5% aqueous solution, which has a freezing point of about $-6°$ C., or a 15% aqueous solution, which has a freezing point of about $-13°$ C. Low-price industrial salts and salts from sea water can be used. A mixture of other salts mentioned above with NaCl may also be used. An aqueous solution of an organic salt, such as citric acid, tartaric acid and so on with an alkali metal such as sodium or potassium can also be employed. Aqueous solutions of two or more salts, such as sea water, can also be used.

It is enough that the concentration of the aqueous solution of salt be above 0.5% by weight. The preferred concentration may be in the range from 1 to 15% by weight, but any concentration up to saturation concentration of the salt may be employed.

For the aqueous alcohol solution, it is convenient to use an aqueous solution of commercially available antifreeze solution containing polyethylene glycol, due to its low price. For the water-soluble alcohols to be employed according to the present invention, there may be enumerated, for example, water-soluble polyhydric alcohol such as ethylene glycol, glycerin, polyethylene glycol and so on as well as mixtures of them. Other ethylene glycol derivatives which will not freeze under the conditions likely to be encountered, in the form of aqueous solutions, may also be employed.

The active substance stored in the reaction chamber isolated from the reacting substance according to the present invention may be one which will undergo a hydration reaction with the reacting substance, such as CaO, $CaCl_2$ and the like. The active substance may preferably be present in a form granulated by calcination. It is also possible to process it by a dustproofing treatment by granulating it using a solvent having no moisture content, if necessary using a water-soluble and solvent-soluble binder material exhibiting a neutral or alkali reaction. The amount of exothermic substance to be used may be calculated from the specific heat of the container's contents, such as foodstuffs or beverages, the amount thereof and the amount of heat generated by the hydration reaction. For instance, when 180 ml of an alcoholic or non-alcoholic beverage, such as wine, sake, coffee or tea, having a specific heat of about 1 is heated to elevate the temperature by more than 50° C., it suffices to use CaO in an amount of about 40–45 g and a water solution of a salt or an aqueous alcohol solution in an amount containing about 12–13 g of water.

It is possible to employ, when needed, a granular heat-resistant material which does not participate to the hydration reaction of the active and reacting substances, in layers or in a scattered distribution. The purpose of this granular material is to dilute the reaction components, to preserve the temperature and to prevent clogging of the exhaust hole. For such a purpose, it is important to distribute the granules over the bulk of the active substance inside the reaction chamber. For such a heat-resistant granular material there may be used, for example, sand, pebbles, metallurgical slag particles, glass beads and so on. By providing such a granular material in the reaction chamber, the rules for the handling of dangerous material may be avoided and, at the same time, the heat generated by the reaction will be absorbed by it to preserve the temperature. The heat-resistant granular material has the role of preventing an abnormal pressure elevation by absorbing the heat generated by the hydration reaction and thus can be likened to a safety valve, so that the safety of the internally heatable container is increased. Moreover, the presence of the particles of the heat-resistant granular material will offer, when they are located on the side of the inner lid in the form of layers, not only the above-mentioned temperature preservation effect but also a better penetration of the steam generated by the reaction.

The inner lid disposed at the opening of the reaction chamber is made of a material permitting penetration of the high temperature steam generated by the hydration reaction. Examples thereof are paper, metal foil, metal-laminated sheet cloth and so on, whose thickness is preferably over 0.01 mm, although no special limitation is placed thereon. When the inner lid is made of paper, metal foil or metal-laminated sheet, means for increasing the gas and steam permeability is incorporated, for example, by providing therein distribution perforations of a circular, square, cruciform or other desired shape, in order to facilitate the penetration of steam. When the inner lid is made of wire net, screening, a punched plate and so on, the perforations can be omitted.

When a gas-permeable member is interposed between the inner lid and the sealing lid, adherence of the inner lid to the sealing lid is prevented, whereby the exhaustion of the steam generated can be achieved effectively without hindrance. As the material of the gas-permeable member, there may be employed, for example, paper textile material, non-woven cloth, sponge, cotton wool or the like. Alternatively, it is possible to employ an inner lid which itself is gas-permeable.

The sealing lid has a hole to use for the initiation of the heat generation reaction at its central portion. This hole is sealed when it is in the pre-operation state by a sealing member consisting of, for example, paper, metal foil, metal-laminated sheet, fusible polymer material, wax or the like. In particular, when the sealing material is made of fusible polymer (PET) which will melt at a temperature of 80°–85° C., it is preferred to cover the sealing lid with this material on the inner face or on the outer face thereof. By sealing the hole of the sealing lid with the sealing material by covering the outer or inner face of the sealing lid, the sealing material will be melted by high temperature steam, when the reaction chamber is heated by an unexpected accident, and thus the temporarily sealed piercing hole will be opened spontaneously to permit the high temperature steam to be discharged safely. It is possible to provide the sealing lid with two or more temporarily-sealed piercing holes in order to attain a more smooth and efficient discharge of the generated high temperature steam. This depends on the size of holes, however; for example: in the case of holes of 2–10 mm in diameter, approximately 2–10 holes can be provided.

The container according to the present invention is further provided with a reaction initiator in the form of a piercer which is used to pierce into the reaction chamber from outside through the temporarily-sealed piercing hole so as to rupture the partition isolating the reaction components to cause them to contact each other for initiation of the reaction. The reaction initiation means may have the form, for example, of an arrowhead, although any other shape may be used so long as it permits rupture of the partition or bag of the reacting substance upon piercing. A piercing rod having such a configuration can permit the reacting substance to flow out into the space occupied by the active substance even when that space contains the piercing rod as such.

The inner diameter of the temporarily sealed piercing hole to be penetrated by the piercer is sufficiently large and is somewhat greater than the maximum outer diameter of the reaction initiation means, namely, the piercer, for example, the width at the arrowhead, and is sufficiently larger than the outer diameter of the shank part of the piercer. When the piercer is inserted into the temporarily-sealed piercing hole up to the shank part thereof, the partition, namely, the bag wall, for the reacting substance is ruptured by the arrowhead of the piercer into a sufficiently large opening. The reacting substance will be caused to flow out the bag through the gap remaining between the pierced hole and the shank even if the piercer is maintained inserted.

Since the gap formed between the shank and the pierced hole is large enough, the high temperature steam generated by the hydration reaction can effectively be discharged from the reaction chamber to the outside. Thus, in the internally heatable container according to the present invention, the exhaustion of the high temperature steam generated can be attained without hindrance even when the piercer is not withdrawn, so that the safety of the container is guaranteed.

The periphery of the sealing lid is tightened by pressing onto the rim of the container by a roll tightening machine in a known manner. In order to increase the seal of the pressed part, it is preferred to apply a solution of water-repellent polymer to the surface of this part. The tightened portion coated with such polymer prevents any penetration of moisture from the ambient atmosphere into the reaction chamber past the pressed seal. Thus, loss of activity can be prevented for a prolonged period of time in storage.

With more particular reference to the drawings, the internally heatable container 1 comprises a container body 2 preferably made of a heat insulating material and a lid 3 of pull-top type or removable type at its upper end. At the bottom of the container body 2, there is arranged a cylindrical inner shell 4. The cylindrical inner shell 4 partitions the container into a contents chamber 5 and a reaction chamber 6. Within the upper part of the reaction chamber 6 is a layer of an active substance 7 together with diluent temperature-preserving material distributed among it. Beneath the exothermic substance 7, a sealed package 9, i.e. a bag, containing the reacting substance 8 is stored. Below the package 9, there is another layer of the active substance 7 together with diluent heat-preserving material. Thus, the package 9 is sandwiched between the two layers of active substance 7 in the reaction chamber 6.

Underneath the lower layer of the active substance 7, there is provided a layer of heat-resistant granular material 10 constituting the diluent heat-preserving material, which may be incorporated as needed. Beneath the layer of granular material 10, an inner lid 11 is arranged, beneath which a gas-permeable member 12 is disposed. A sealing lid 13 is placed on the gas-permeable member 12 and is tightened at its periphery by rolling onto the rim of the container body 2 using a conventional roll-tightening machine (not shown) to build up an integral unit. The rolled-over portion 14 is, if necessary, treated by applying a seal 15 of a polymer solution to improve the seal. By this seal 15, any penetration of moisture from the ambient atmosphere into the reaction chamber 6 is reliably prevented.

The sealing lid 13 is provided at its central portion with a temporarily sealed piercing hole 16. The hole 16 is sealed by a sealing material 17 on the outside of the sealing lid. The sealing material 17 is ruptured by the pointed end 19 of a reaction initiation means, namely, piercer 18. The piercer 18 is caused to pierce through the package wall of the package 9 to rupture it so as to form a sufficiently large opening therein. The maximum width $W_1$ of the arrow-shaped end 19 is a little less than the inner diameter $W_2$ of the temporarily sealed piercing hole 16; and the outer diameter $W_3$ of the shank 20 of the piercer is substantially smaller than the inner diameter $W_2$ of the temporarily sealed piercing hole 16. It is possible to provide the piercer in its shank part with a sealing stopper to adapt to the temporarily sealed piercing hole 16.

It is preferred to arrange small bores 21 about the piercing hole 16 in the sealing lid so as to allow discharge of the hot steam generated by the reaction. In the embodiment of FIG. 1, a protecting cover 22 is fitted onto the sealing lid 13 in a removable manner.

In order to initiate the hydration reaction between the active substance 7 and the reacting substance 8 stored in the reaction chamber, the piercer 18 is caused to pierce the sealing material of the temporarily sealed piercing hole by its arrow-shaped end 19 and is further inserted into the package 9 to rupture the package wall (the arrowshaped end is indicated in FIG. 1 by the dotted line). Thereupon, the reacting substance 8 flows out into the reaction chamber 6 to contact the active substance 7 and thus to initiate the exothermic hydration reaction. By the hydration reaction inside the reaction chamber 6, high temperature steam is generated and the temperature inside the reaction chamber increases. A part of the steam generated is discharged from the piercing hole 16 to the outside of the container, so that the pressure inside the reaction chamber 6 is controlled so as not to reach an abnormal pressure. The heat generated in the reaction chamber 6 is exchanged with the contents within the container through the cylindrical inner shell 4. On discharging the hot steam, no clogging of the passage of the steam will occur and the steam will be discharged very effectively. The muddy product of $Ca(OH)_2$ is dammed up by the layer of the granular material 10, so that it can hardly reach the inner lid 11 or the gas-permeable member 12, so that no clogging of the steam path occurs and the steam will be discharged smoothly.

As explained above, the internally heatable container according to the present invention provides a very effective discharge of the hot steam generated by the hydration reaction between the active substance and the reacting substance within the reaction chamber, so that there is no danger of occurrence of abnormally high pressure in the reaction chamber and the reaction can proceed within a safe pressure range. Thus, according to the present invention, an internally heatable container of very great safety is provided.

What is claimed is:

1. A container capable of heating the contents of the container from inside, having at its bottom a cylindrical inner shell made of a thermoconductive material opening downward and defining internally of itself a reaction chamber in which are disposed an active substance and a reacting substance capable of causing an exothermic reaction upon contact with each other, a partition isolating said substances from each other, a covering lid disposed across the opening of said inner shell so as to cover the reaction chamber and to constitute the bottom of the container, said covering lid having a temporarily sealed piercing hole therethrough, and a separate piercer for piercing through said temporarily sealed piercing hole and said partition into the reaction chamber, said piercer having an enlarged head that is of lesser width than the internal diameter of said piercing hole, a shank of substantially lesser width than said enlarged head, an enlarged tail of substantially greater width than said shank, and an extent such that when said piercer is fully inserted in said cylindrical inner shell said enlarged head is disposed beyond said partition and said enlarged tail is disposed in said piercing hole to temporarily seal such and act as a pressure release control.

2. A container as claimed in claim 1, and an inner lid permitting the passage of gas and steam disposed across the opening of the inner shell inside the covering lid, and a gas-permeable member interposed between the inner lid and the covering lid.

3. Container according to claim 1, wherein said enlarged head of said piercer is substantially conical, and said shank and said enlarged tail of said piercer are substantially cylindrical.

* * * * *